Feb. 22, 1955 — E. L. LAUNDER — 2,702,490
RESILIENT RETAINER PIN
Filed Aug. 21, 1946 — 2 Sheets-Sheet 1
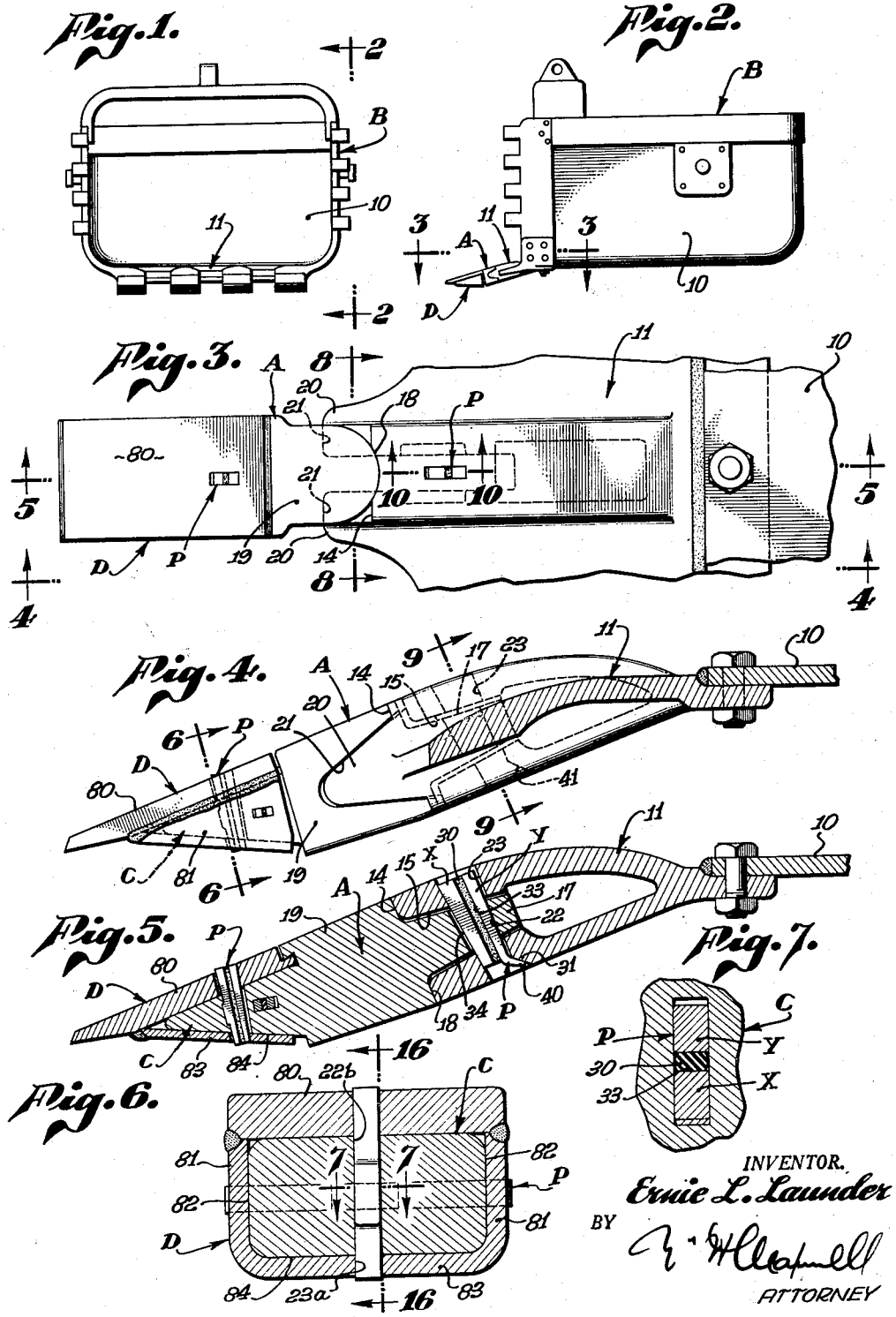
INVENTOR.
Ernie L. Launder Feb. 22, 1955     E. L. LAUNDER     2,702,490
RESILIENT RETAINER PIN
Filed Aug. 21, 1946     2 Sheets-Sheet 2
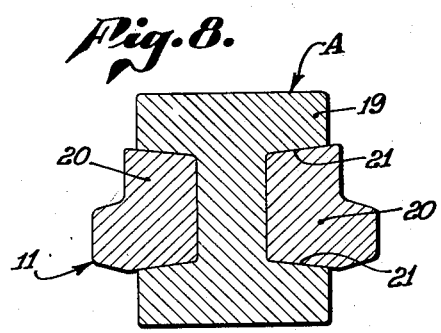
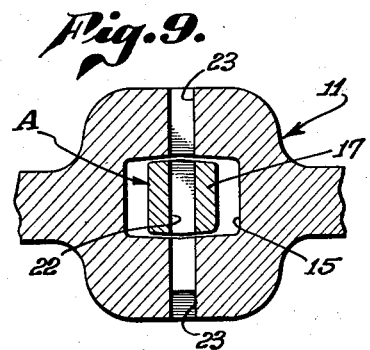
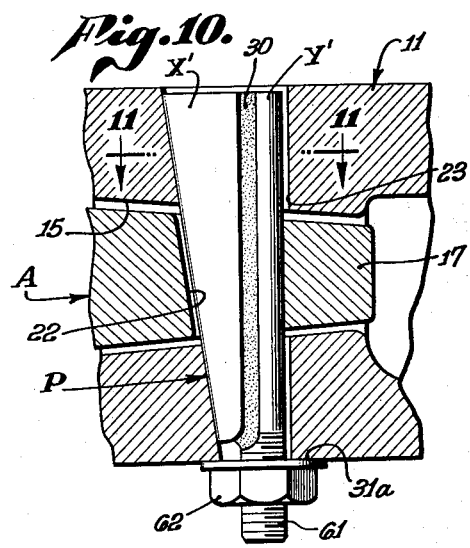
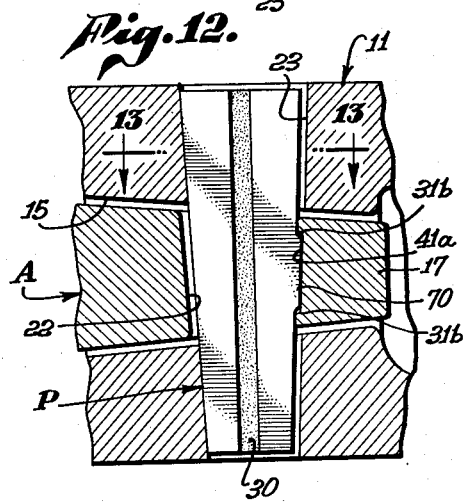
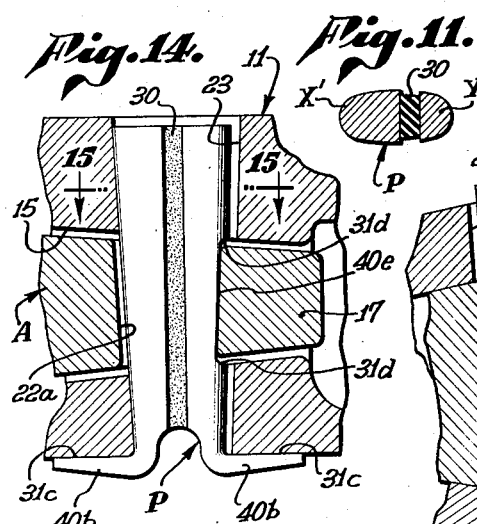
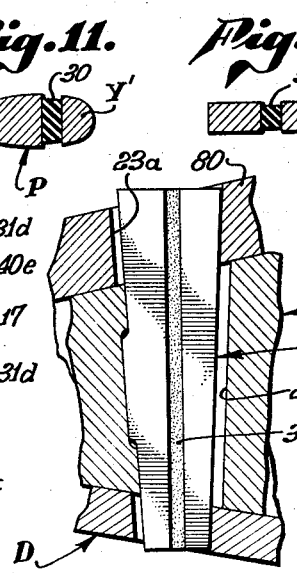
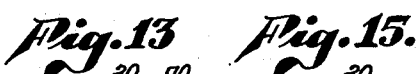
INVENTOR.
Ernie L. Launder
BY
ATTORNEY

United States Patent Office 2,702,490
Patented Feb. 22, 1955

2,702,490

RESILIENT RETAINER PIN

Ernie L. Launder, Montebello, Calif.

Application August 21, 1946, Serial No. 691,974

7 Claims. (Cl. 85—8.3)

This invention has to do with a retainer pin and is concerned primarily with a pin of the type that can be employed to advantage in digger teeth, or the like, for example in the connection of a tooth adapter to a base or in the connection of a tooth cap to a tooth, and it is a general object of the invention to provide a simple, effective and improved retainer pin.

There are numerous situations where retainer pins are employed to connect parts which must be joined or connected securely and which are subjected to severe working conditions which tend to rack the parts or cause them to work loose and possibly to separate. An example of such a situation is a digger tooth such as is employed in shovels, trenching machines, and the like, and for that reason we will, in describing our present invention, refer to it in such a situation, it being understood that it may be employed generally where parts are to be securely and dependably connected.

It is a general object of the present invention to provide a retainer pin that is tapered and which has resilient means whereby the pin upon being drawn or driven into place wedges the connected parts tightly together and thereafter remains tight to prevent the parts from working or shifting relative to each other.

It is a further object of the present invention to provide a retainer pin of the general character referred to which is simple and dependable and which involves an effective, dependable locking means that serves to set the pin against displacement.

It is another object of the present invention to provide a pin of the general character referred to which can be easily and quickly applied so that it effectively and dependably connects the parts to be joined and can be readily removed when it is desired to separate the parts.

The various objects and features of my invention will be fully understood from the following detailed description of typical preferred forms and applications of my invention, throughout which description reference is made to the accompanying drawings, in which:

Fig. 1 is a front elevation of a digger bucket involving digger teeth with parts connected by means of the structure of the present invention. Fig. 2 is a side elevation of the bucket shown in Fig. 1, being a view taken as indicated by line 2—2 on Fig. 1. Fig. 3 is an enlarged plan view of one of the digger teeth, being a view taken substantially as indicated by line 3—3 on Fig. 2. Fig. 4 is a side view of the tooth being a sectional view taken substantially as indicated by line 4—4 on Fig. 3, and showing the tooth adapter applied to the base without the retaining pin. Fig. 5 is a sectional view taken as indicated by line 5—5 on Fig. 3 showing one form of pin connecting the adapter to the base. Fig. 6 is a transverse detailed sectional view taken as indicated by line 6—6 on Fig. 4. Fig. 7 is an enlarged transverse sectional view taken as indicated by line 7—7 on Fig. 6. Fig. 8 is an enlarged transverse sectional view taken as indicated by line 8—8 on Fig. 3. Fig. 9 is an enlarged transverse sectional view taken as indicated by line 9—9 on Fig. 4. Fig. 10 is an enlarged detailed sectional view taken as indicated by line 10—10 on Fig. 3 showing another form of pin in place. Fig. 11 is a transverse sectional view taken as indicated by line 11—11 on Fig. 10. Fig. 12 is a view similar to Fig. 10 showing another form of construction. Fig. 13 is a detailed sectional view taken as indicated by line 13—13 on Fig. 12. Fig. 14 is a view similar to Figs. 10 and 12, showing another form of construction. Fig. 15 is a detailed transverse sectional view taken as indicated by line 15—15 on Fig. 14, and Fig. 16 is an enlarged detailed view taken as indicated by line 16—16 on Fig. 6.

The present invention is concerned primarily with a retainer pin to be employed to connect elements such for example as an adapter to a base or a cap to a tooth, and it is particularly useful in situations where the connected elements are subjected to severe working conditions tending to work or shift them relative to each other and where it is highly desirable that the connection be such that it can be easily and quickly established without the use of special tools or equipment, and that it be such as to be readily replaceable when necessary. In the drawings we have, for purpose of example, shown the retainer pin of the present invention used in two typical situations, one to retain an adapter on a base and another to retain a cap on a tooth, and we have shown several modified forms of the invention each of which can be used in situations such as those mentioned.

The tooth construction illustrated in the drawings is shown on a bucket B having a plurality of digger teeth. In the particular construction shown the body 10 of the bucket is equipped at its forward edge or lip with a part that will be referred to as a base 11 and this part is provided at suitable intervals along its length with projecting parts for carrying teeth. In some instances the teeth or working parts are mounted on or applied directly to the base 11 while in other cases the teeth are on adapters which, in turn, are applied to the base.

In the case illustrated we show a tooth construction which involves, generally, an adapter A having or carrying a tooth C, and the adapter is applied to the base 11. The tooth C is shown equipped with a replaceable cap D. The adapter A and base 11 are made to fit together, as will be hereinafter described, and are shown retained together by a retainer pin. This is also true of the cap D which is applied to the tooth C. In Fig. 5, for example, we show the adapter connected to the base and retained on the base by one form of pin while the cap is shown retained on the tooth by means of another form of pin. In Figs. 10, 12 and 14 we show other forms of pin construction that can be used either to connect the adapter to the base or the cap to the tooth.

The base 11, as shown throughout the drawings, has a forwardly projecting tooth carrying portion and it is to this portion that the adapter A is applied. The projecting portion of the base has a front end face 14 that is provided with a socket 15 that receives a tongue 17 projecting from the adapter A. The socket 15 is inwardly tapered or convergent, as clearly shown in Fig. 5 of the drawings, and the tongue 17 is correspondingly shaped and it is proportioned to fit with a limited amount of clearance into the socket when the inner end 18 of the adapter body 19 engages the face 14 of the base. In the particular construction illustrated spaced forwardly projecting side parts or flanges 20 project forward from the face 14 of the base and these flanges extend and fit or bear into recesses 21 provided in the sides of the body 19 of the adapter. This general construction is clearly illustrated in Figs. 4 and 8 of the drawings.

It is contemplated that the tongue 17 of the adapter A be retained in the socket of the base by a retainer or pin embodying the present invention and to accommodate a retainer pin the tongue has a transverse passage 22 formed through it while the portion of the base in which the socket 15 is formed has opposite or registering openings 23 designed to register with or be in substantial alignment with the passage 22 when the adapter is fully engaged with the base. Since the retainer pin provided by the present invention is tapered lengthwise to be somewhat smaller at one end than at the other, the pin receiving channel established by the passage 22 and openings 23 is made to be correspondingly tapered as will appear throughout the drawings.

The retaining pin P shown in Fig. 5 of the drawings is of one form in which the invention can be embodied and involves, generally, two longitudinal sections X and Y with the resilient means 30 located between them and with a shoulder 31 which retains the pin in operating or engaged position. The pin sections X and Y have flat opposed inner faces 33 between which the means 30 is carried and they have outer faces 34 shaped and proportioned to fit the passage 22 and openings 23 formed to receive the pins.

The means 30 is arranged or confined between the two sections of the pin and is preferably formed of a body of rubber or rubber-like material which is resilient or which acts to urge the pin sections apart laterally upon the pin being forced tightly into operating position. In the drawings I have shown the means 30 in the form of a single sheet or block of rubber-like material between the faces 33 of the pin sections and I prefer to form them slightly narrower than the pin sections to allow for expansion of the body 30 when the pin sections are under working pressures. I prefer to bond the pin sections to the body of rubber so that the two pin sections and the rubber are combined into a single unit that can be easily handled and which remains assembled under all ordinary conditions.

In practice the desired taper of the pin P may be gained in any suitable manner. For instance either one or both pin sections can be tapered lengthwise. In Fig. 5 I have shown both pin sections tapered slightly lengthwise so that the pin assembly has a substantial amount of taper, being the taper provided in the passage and openings in the tongue and base respectively.

The shoulder 31 or lock means provided for retaining the pin P in operating position may vary as will be hereinafter described. In the particular pin under consideration the lock shoulder 31 is on an extension or projecting end portion 40 which is malleable to the extent that it can be bent or deflected to the position shown in Fig. 5. The projecting end or shoulder carrying portion of the pin section can be bent over any suitable part of the assembled construction, for instance over the exterior of the base 11, if desired, or as shown in the drawings one of the openings 23 in the base may be provided with a recess or enlargement 41 for the reception of the part 40, so that the part 40 can be bent over and into the recess 41, as shown in Fig. 5 of the drawings. It will be apparent from an examination of the drawings that when the projecting end part of the pin section is bent or deflected the shoulder 31 is established to cooperate with the base 11 so that the pin is retained in position, it being noted that the projection 40 is at the small end of the pin so that it effectively serves to retain the pin in position.

The form of retaining pin illustrated in Figs. 10 and 11 of the drawings varies somewhat from that just described in that the two sections X' and Y' of the pin are not alike or both tapered, but rather the section Y' is straight or uniform in size throughout its length while the section X' is tapered considerably to give the pin the desired longitudinal taper. In this form of the invention the pin sections X' and Y' are completely divided or separated by the resilient means 30 or the body of rubber employed between the sections, and in the form of the invention now under consideration the lock shoulder 31$^a$ is established at the small end of the pin by a washer or collar carried on a threaded stud 61 projecting from the small end of the pin and carrying a nut 62 which retains the collar. This particular construction requires no deflection or deformation of parts but rather it is merely necessary, when desired, to set the pin to tighten the nut 62 on the stud 61 in a manner to force the collar toward the small end of the pin. The shoulder 31$^a$ of the collar bears against the base or the part that it engages and consequently the pin is drawn into the passage 22 and openings 23 until the pin is tight or in full working position.

It is to be understood that the pin whether it be of the form just described or of the other forms may be initially inserted when the adapter and base are related with the passage 22 and openings 23 out of line and the pin can be operated or made tight either by being driven or drawn to bring the passage and openings into a position were they approach alignment as shown throughout the drawings. This drawing effect gained by the taper of the pin causes compression of the body of rubber between the pin sections and the compression or force thus applied to the body of rubber deforms the rubber, with the result that the rubber thereafter acts to urge the pin sections apart and thus maintains the pin tight in working position.

In Figs. 12 and 13 of the drawings a form of pin is shown which is similar, generally, to that shown in Fig. 5, except that the locking means is slightly different. In this form of the invention a projection 70 is provided on one of the pin sections not at the end, as shown in Fig. 5, but intermediate the ends of the pin section, and this projection is formed to present lock shoulders 31$^b$. The two shoulders established by the projection 70 face in opposite directions or toward opposite ends of the pin. One of the parts engaged by the pin, for instance the tongue 17 of the adapter A, is provided with a recess 41$^a$ in the wall of the passage 22, which recess is shaped and proportioned to receive the projection 70. When the projection is engaged in the recess the shoulders 31$^b$ engage the opposite walls of the recess and thus retain the pin in place.

It will be apparent that with the construction shown in Figs. 12 and 13 it is unnecessary to deflect or deform any part or portion of the structure and it is unnecessary to operate any part such as the nut 62 in the form shown in Fig. 10, but rather it is merely necessary to drive the pin into place until the projection 70 registers with the recess 41$^a$, whereupon these parts engage to assume the position shown in Fig. 12. By slightly tapering the shoulders 31$^b$ and the sides of the recess 41$^a$ it is possible to drive the pin out by the application of sufficient force.

In the form of the invention shown in Figs. 14 and 15 each pin section is provided with a projection 40$^b$ which projects from the small end of the section. The projections 40$^b$ are adapted to be deflected or bent over to establish lock shoulders 31$^c$ in the manner clearly shown in the drawings. It will be understood, of course, that either one or both of the pin sections can be provided with a projection 40$^b$. Further, in this form of the invention the form of lock means just described is combined with the form of lock means shown in Fig. 12 of the drawings, except that the lock shoulders 31$^d$ provided intermediate the ends of one pin section are not established by a projection on the pin section, but rather by providing a recess 40$^e$ in the outer side of one of the pin sections. In this case the passage 22$^a$ through the tongue is made somewhat narrower or smaller than the openings 23 and when the pin is fully engaged or is in place the shoulders 31$^d$ occur beyond opposite ends of the passage 22$^a$.

Thus far retainer pins embodying the present invention have been described as retaining the adapter A in connection with the base 11. In practice the retainer pins can be used in various situations. For example, in a digger tooth they can be used to advantage to retain the cap D on the tooth C.

In the drawings a typical tooth cap is shown involving a body 80 designed to bear on the top of the tooth and to project forward from the tooth. A housing is secured to the body 80 to engage around the tooth and has sides 81 to fit against the sides 82 of the tooth and has a bottom 83 which fits the bottom 84 of the tooth. The tooth C is shown as an integral projection on the forward end of the body 19 of adapter A and is tapered. The housing and body 80 cooperate to form a tapered socket or cavity into which the tooth fits as clearly shown in Fig. 5 of the drawings.

If desired any number of retaining pins may be employed to secure adapters to the base or lip of the bucket B or to secure a cap to a tooth C. In the drawings I have illustrated two such pins employed to secure a cap to a tooth and it will be observed that I may arrange the pins normal to each other, for instance, I have shown one pin arranged horizontally through the tooth and the other pin arranged vertically through the tooth.

In applying the retaining pins embodying the present invention to the structure just described the tooth has transverse passages 22$^b$ and openings 23$^a$ are provided in the cap. The passages 22$^b$ and 23$^a$ correspond, generally, with the passage 22 and openings 23 as shown in Fig. 5 of the drawings, and it will be apparent how the retainer of the present invention can be applied to these parts in the manner hereinabove described. In the drawings a retainer pin of the type shown in Fig. 12 is shown applied to the tooth and cap, it being apparent how the parts shown in Fig. 12 correspond to and act in the same manner as those shown in Fig. 6.

It will be observed that the retainer pin constructions that are provided by this invention can be readily and quickly applied either by forcing them into place or by drawing them into place and it is to be noted that when a lock pin embodying the present invention is applied in the proper manner the means 30 acting between the pin sections serves to absorb shock and to compensate for slight working between the connected parts, to the end that the construction remains tight at all times and will not rattle or shift in the manner to cause excessive wear or to give other trouble.

In arranging a pin in place the body of rubber 30 is arranged so that it extends, generally, transverse of the direction in which the parts fit together, as is shown throughout the drawings. Further, it will be apparent from an examination of Figs. 11, 13 and 15 of the drawings that the retainer pin can be formed so that it has various cross sectional configurations. For instance, as shown in Fig. 11, it is substantially oval or elliptical in shape, whereas in Fig. 13 it is rectangular in cross section while in Fig. 15 it is like it is in Fig. 13 except that its ends are rounded. It will be apparent, of course, that any desired cross sectional configuration can be employed in connection with any of the forms of the pin as above described.

In manufacture of the pin that I have provided the two sections between which the resilient means is located are preferably formed of metal and in most cases I prefer that the parts be treated so that they are hard and wear resisting except, of course, that the projections of the lock means, as shown in Figs. 5 and 14, must be malleable to the extent that they can be deformed in the manner illustrated.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A retaining pin for coupling separable parts including, two longitudinal sections with exterior surfaces engaging said parts, resilient means between the sections normally holding said surfaces in pressure engagement with said parts, and lock means including a shoulder on one section at the exterior thereof and intermediate the ends thereof and engageable with one of said parts and a deformable projection on the end of one section engageable with one of said parts.

2. A tapered retaining pin for holding separable parts including, two elongate rigid sections with angularly related exterior surfaces engaging said parts, resilient means between the sections holding said surfaces in pressure engagement with said parts, and lock means including a shoulder on one section intermediate the ends of said surfaces and a deformable projection on the end of each section at the small end of the pin.

3. A retaining pin for coupling separable parts including, two elongate rigid sections with exterior surfaces engaging said parts, and resilient means between the sections normally holding said surfaces in pressure engagement with said parts, one of the sections being recessed intermediate the ends of the exterior surface thereof forming a lock shoulder engageable with one of said parts.

4. A retaining pin for coupling separable parts including, two elongate rigid sections with exterior surfaces engaging said parts, resilient means between the sections normally holding said surfaces in pressure engagement with said parts, and lock means including a shoulder at the exterior of one section intermediate the ends thereof and engageable with one of said parts, the shoulder being pitched relative to a plane normal to the longitudinal axis of the pin.

5. A tapered retaining pin for coupling separable parts including, two elongate rigid sections with exterior surfaces engaging said parts and diverging as they extend from the small end of the pin to the large end thereof, resilient means between the sections normally holding said surfaces in pressure engagement with said parts, and lock means including a shoulder on one section intermediate the ends thereof and engageable with one of said parts.

6. A tapered retaining pin for coupling separable parts including, two elongate rigid sections with angularly related exterior surfaces engaging said parts, and resilient means between the sections holding said surfaces in pressure engagement with said parts, the exterior surface of one section being recessed intermediate its ends forming a lock shoulder engaging one of said parts.

7. A tapered retaining pin for separable parts including, two elongate rigid sections with longitudinally divergent exterior surfaces engaging said parts and diverging as they extend from the small end of the pin to the large end thereof, resilient means between the sections holding said surfaces in pressure engagement with said parts, and lock means including a member on one section engageable with one of said parts, the exterior of one section being recessed between the ends of said section forming a pitched lock shoulder engageable with one of said parts.

References Cited in the file of this patent

UNITED STATES PATENTS

| Number | Name | Date |
|---|---|---|
| 735,794 | Morgan | Aug. 11, 1903 |
| 1,435,811 | Cuntala | Nov. 14, 1922 |
| 2,055,265 | Swigert | Sept. 22, 1936 |
| 2,279,960 | Terry | Apr. 14, 1942 |
| 2,312,802 | Crawford | Mar. 2, 1943 |